United States Patent
Banerjee et al.

(10) Patent No.: US 10,592,337 B1
(45) Date of Patent: Mar. 17, 2020

(54) SYSTEMS AND METHODS FOR DISTRIBUTING INFORMATION ACROSS DISTRIBUTED STORAGE DEVICES

(71) Applicant: Veritas Technologies LLC, Mountain View, CA (US)

(72) Inventors: Anindya Banerjee, Pune (IN); Shailesh Marathe, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 56 days.

(21) Appl. No.: 15/937,754

(22) Filed: Mar. 27, 2018

(51) Int. Cl.
G06F 11/10 (2006.01)
G06F 3/06 (2006.01)

(52) U.S. Cl.
CPC .......... *G06F 11/1076* (2013.01); *G06F 3/067* (2013.01); *G06F 3/0619* (2013.01); *G06F 3/0632* (2013.01); *G06F 3/0644* (2013.01); *G06F 3/0647* (2013.01)

(58) Field of Classification Search
CPC .... G06F 11/1076; G06F 3/0644; G06F 3/067; G06F 3/0647; G06F 3/0619; G06F 3/0632

USPC .......................................................... 714/764
See application file for complete search history.

(56) References Cited

U.S. PATENT DOCUMENTS

| | | | | |
|---|---|---|---|---|
| 7,761,663 B2* | 7/2010 | Frolund | .............. | G06F 11/1064 709/201 |
| 8,055,845 B2* | 11/2011 | Soules | ................ | G06F 12/0862 709/223 |
| 8,677,208 B2* | 3/2014 | Wylie | ................. | G06F 11/1044 714/756 |
| 9,595,979 B2* | 3/2017 | Blaum | ................ | H03M 13/373 |
| 9,916,478 B2* | 3/2018 | Slik | .......................... | G06F 21/78 |
| 2007/0192544 A1* | 8/2007 | Frolund | .............. | G06F 11/1064 711/135 |

* cited by examiner

*Primary Examiner* — James C Kerveros
(74) *Attorney, Agent, or Firm* — FisherBroyles, LLP (57) ABSTRACT

The disclosed computer-implemented method for distributing information across distributed storage devices may include (1) dividing, at a computing device, each of "K" distributed storage devices (DSDs) in a plurality of DSDs into "P" portions, where "P" is a sum of "M" data portions and "N" parity portions, (2) creating "K" erasure-coded volumes, where each volume includes one portion on different DSDs, "M" data portions, and "N" parity portions, and (3) combining the "K" volumes to create a file system. Various other methods, systems, and computer-readable media are also disclosed.

20 Claims, 4 Drawing Sheets

SYSTEMS AND METHODS FOR DISTRIBUTING INFORMATION ACROSS DISTRIBUTED STORAGE DEVICES

BACKGROUND

Information is often stored using fault-tolerant storage methods such as erasure coding. Erasure coding provides fault-tolerant storage by breaking information into "m" data columns, producing "n" parity columns, storing data chunks on "m" data nodes, and storing parity chunks on "n" parity nodes. This arrangement may tolerate "n" failures, as a ratio of data nodes to parity nodes may be generally represented as "m:n". Despite being a robust system, if one new node is added, thus providing a total of n+m+1 nodes, the new node cannot be used, as growing the storage volume requires adding (m+n) new nodes, so that first "m" new nodes store data and next "n" new nodes store parity information. Being required to add (m+n) new nodes as a minimum to increase storage capacity of systems unnecessarily increases costs and wastes resources such as power and network bandwidth. A single new node can be used, by doing complete relayout of the data (represented either as m+1:n or m:n+1), but that results in huge amounts of data churn in systems, resulting in consumption of costly resources such as storage and network bandwidth. The instant disclosure, therefore, identifies and addresses a need for improved systems and methods for distributing information across distributed storage devices.

SUMMARY

As will be described in greater detail below, the instant disclosure describes various systems and methods for distributing information across distributed storage devices by, for example, apportioning nodes into data portions and parity portions, creating volumes from the portions, and combining the volumes to create a file system. When a new storage device is added, the new storage device may be divided into data portions and parity portions, data information and parity information may be moved to the new storage device from another storage device in the system, and a new volume may be created from the portions of the other storage device from which the data information and parity information was transferred. The new volume may be added to the file system.

In one embodiment, a method for distributing information across distributed storage devices may include (1) dividing, at a computing device, each of "K" distributed storage devices (DSDs) in a plurality of DSDs into "P" portions, where "P" is a sum of "M" data portions and "N" parity portions, (2) creating "K" erasure-coded volumes, where each volume includes one portion on different DSDs, "M" data portions, and "N" parity portions, and (3) combining the "K" volumes to create a file system.

In embodiments, the method may include (1) adding a new DSD to the plurality of DSDs and (2) dividing the new DSD into "P" portions. In examples, the method may include (1) moving data information and parity information to portions of the new DSD from portions of other DSDs in the plurality of DSDs, and (2) creating a new volume from the portions of the other DSDs in the plurality of DSDs from which the data information and parity information was moved. In examples, the method may include adding the new volume to the file system.

In one example, each of the "P" portions may be substantially the same size. In further embodiments, each of the "P" portions store information as a part of a striped storage scheme. In examples, each DSD in the plurality of DSDs stores data portions and parity portions for different volumes.

In one example, a system for distributing information across distributed storage devices may include several modules stored in memory, including (1) a dividing module, stored in a memory, that divides each of "K" distributed storage devices (DSDs) in a plurality of DSDs into "P" portions, where "P" is a sum of "M" data portions and "N" parity portions, (2) a creating module, stored in a memory, that creates "K" erasure-coded volumes, wherein each volume includes one portion on different DSDs, "M" data portions, and "N" parity portions, and (3) a combining module, stored in a memory, that combines the "K" volumes to create a file system. The system may also include at least one physical processor that executes the dividing module, the creating module, and the combining module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) divide, at the computing device, each of "K" distributed storage devices (DSDs) in a plurality of DSDs into "P" portions, wherein "P" is a sum of "M" data portions and "N" parity portions, (2) create "K" erasure-coded volumes, wherein each volume includes one portion on each DSD, "M" data portions, and "N" parity portions, and (3) combine the "K" volumes to create a file system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for distributing information across distributed storage devices. In some examples, the systems and methods described herein may divide data storage devices into data portions and parity portions. The systems and methods may then create volumes from the data portions and the parity portions and combine the volumes to create file systems. When new storage devices are added to the systems, the new storage devices may be divided into data portions and parity portions, data information and parity information may be moved to the new storage devices from other storage devices in the systems, and new volumes may be created from the portions of the other storage devices from which the data information and parity information was transferred. The new volumes may be added to the file systems. In examples, the provided systems and methods may be used not only with storage devices, but also with failure domains and/or nodes. In embodiments, the disclosed techniques may be utilized in connection with cloud-based storage devices.

By doing so, in examples, the systems and methods described herein may improve the functioning of computing devices by automatically enabling increasing storage system capacity of fault-tolerant storage systems by one storage device at a time, thus enabling cost-effective storage management. Further, the systems and methods described herein may improve the functioning of computing devices by automatically enabling systems to provide up to substantially all available storage capacity without requiring changing erasure coding parameters and/or growing storage capacity by adding a multiple number of nodes. Further, in examples, the systems and methods described herein may improve the functioning of computing devices by being flexibly applicable to multiple types of storage arrangements (e.g., striping or RAID0, RAID 4, RAID5, and/or RAID6). Also, in examples, the systems and methods described herein may also save power and/or better-manage network bandwidth utilization, such as by mitigating data churn.

Figure 1:
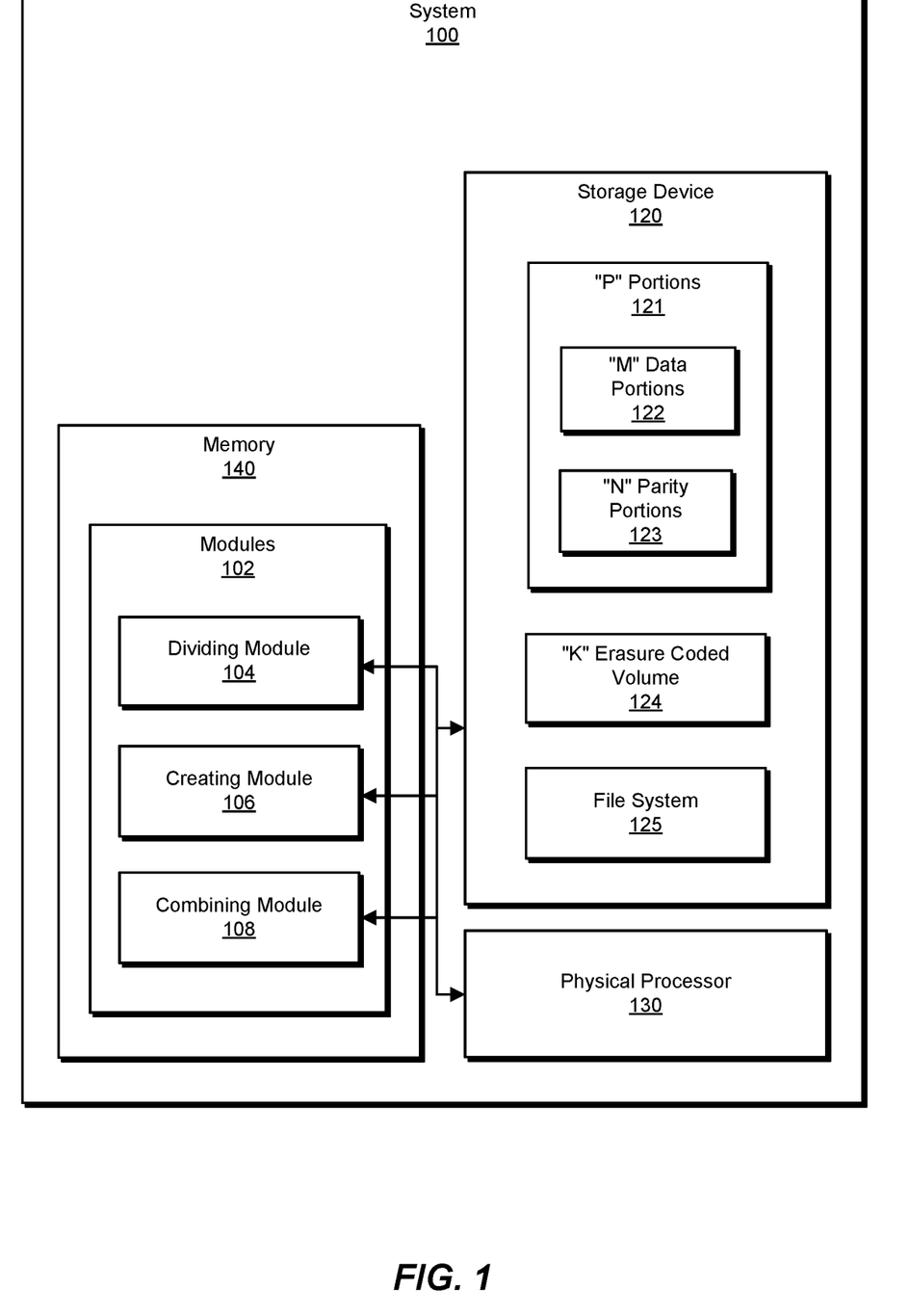
FIG. 1 is a block diagram of an example system for distributing information across distributed storage devices.
Figure 2:
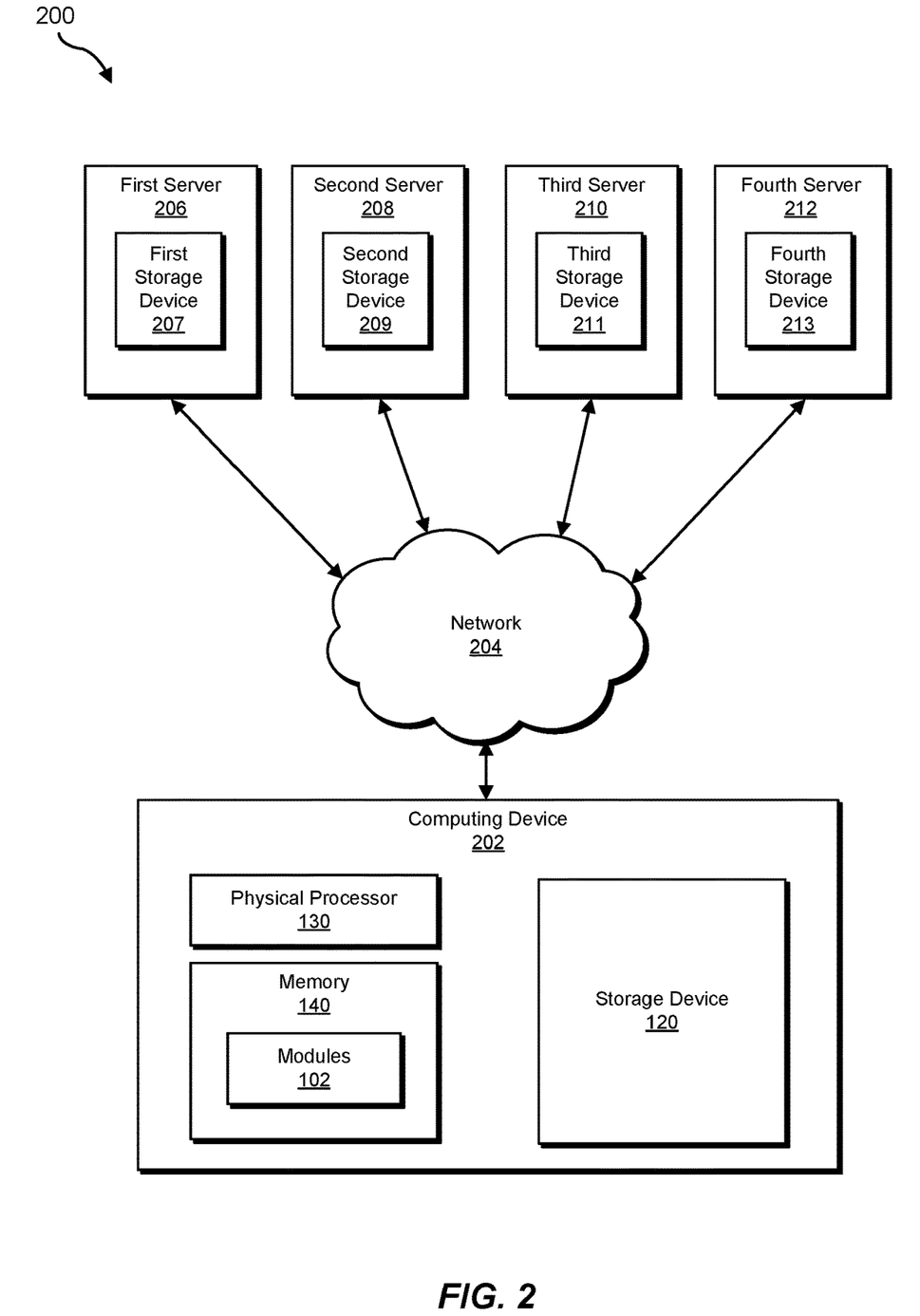
FIG. 2 is a block diagram of an additional example system for distributing information across distributed storage devices.
Figure 3:
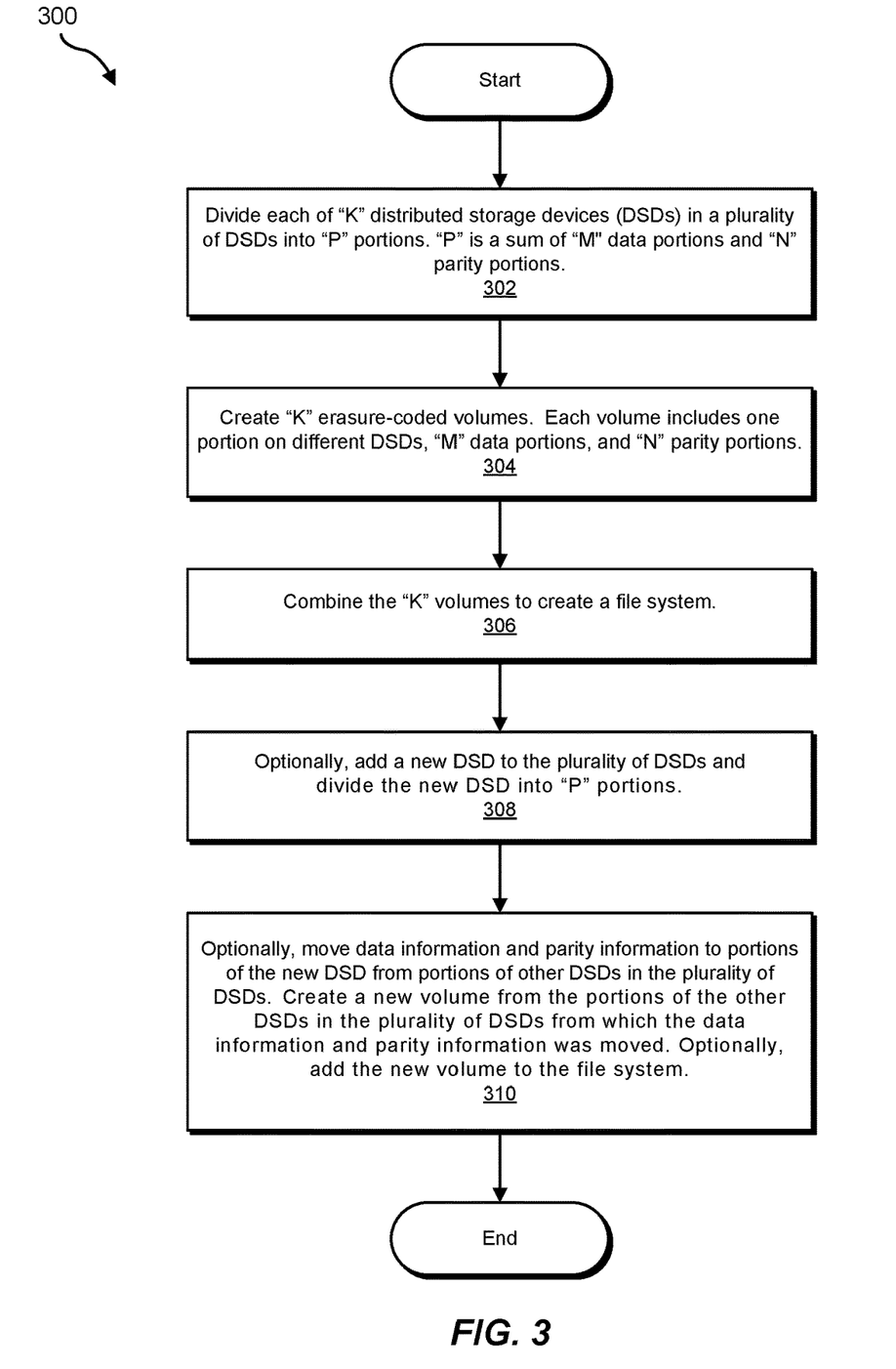
FIG. 3 is a flow diagram of an example method for distributing information across distributed storage devices.
Figure 4:
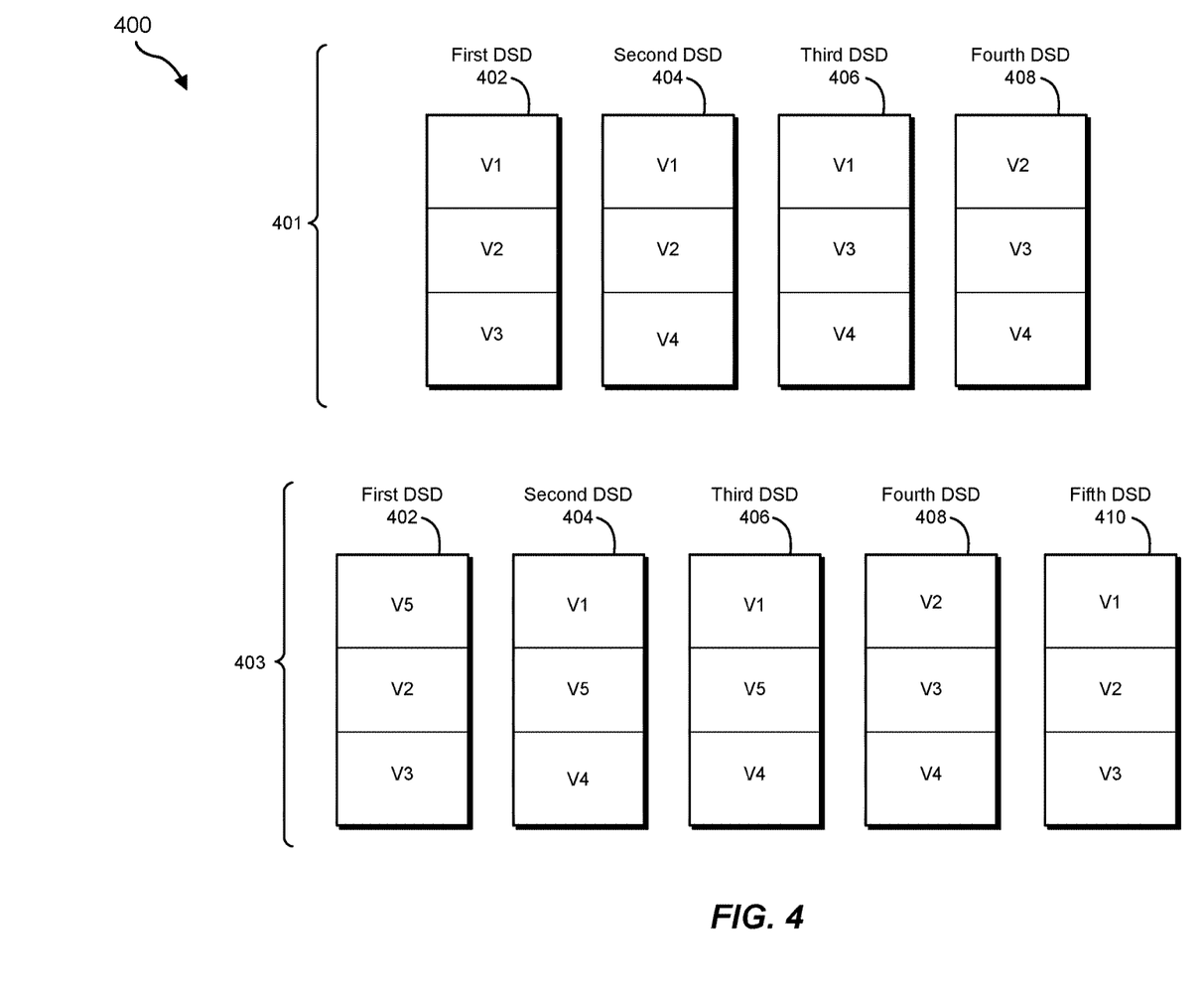
FIG. 4 is a block diagram of an example of an additional example system for distributing information across distributed storage devices.

The following will provide, with reference to FIGS. 1-2 and 4, detailed descriptions of example systems for distributing information across distributed storage devices. Detailed descriptions of corresponding computer-implemented methods will also be provided in connection with FIG. 3.

FIG. 1 is a block diagram of an example system 100 for distributing information across distributed storage devices. As illustrated in this figure, example system 100 may include one or more modules 102 for performing one or more tasks. As will be explained in greater detail below, modules 102 may include a dividing module 104, a creating module 106, and a combining module 108. Although illustrated as separate elements, one or more of modules 102 in FIG. 1 may represent portions of a single module or application. In examples, system 100 may be a storage device controller, such as a RAID controller and/or an array controller that controls distributing information across distributed storage devices, failure domains, and/or nodes.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of "P" portions 121, "M" portions 122, "N" Parity portions 123, a "K" erasure coded volume 124, and/or a file system 125. Examples of storage device 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate distributing information across distributed storage devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

Example system 100 in FIG. 1 may be implemented in a variety of ways. For example, all or a portion of example system 100 may represent portions of example system 200 in FIG. 2. As shown in FIG. 2, system 200 may include a computing device 202 in communication via a network 204 with servers, such as a first server 206, a second server 208, a third server 210, and/or a fourth server 212. In one example, all or a portion of the functionality of modules 102 may be performed by computing device 202, first server 206, second server 208, third server 210, fourth server 212, and/or any other suitable computing system. As will be described in greater detail below, one or more of modules 102 from FIG. 1 may, when executed by at least one processor of computing device 202, first server 206, second server 208, third server 210, fourth server 212, and/or any other suitable computing system, enable computing device 202, first server 206, second server 208, third server 210, fourth server 212, and/or any other suitable computing system to distribute information across distributed storage devices.

Computing device 202 generally represents any type or form of computing device capable of reading computer-executable instructions. In some examples, computing device 202 may represent computer running storage management software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, Internet-of-Things devices (e.g., smart appliances, etc.), gaming consoles, variations or combinations of one or more of the same, or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

First server 206, second server 208, third server 210, and/or fourth server 212 generally represent any type or form of computing device that is capable of storing information. Additional examples of first server 206, second server 208, third server 210, and/or fourth server 212 include, without limitation, storage servers, database servers, application servers, and/or web servers configured to run certain software applications and/or provide various storage, database, and/or web services. Although illustrated as a single entity in FIG. 2, first server 206, second server 208, third server 210, and/or fourth server 212 may include and/or represent a plurality of servers that work and/or operate in conjunction with one another.

In embodiments, first server 206, second server 208, third server 210, and/or fourth server 212 may be coupled to and/or have as a constituent component at least one respective storage device (e.g., a distributed storage device), such as a first storage device 207, a second storage device 209, a third storage device 211, a fourth storage device 213, and/or any other suitable information storage device. First storage device 207, second storage device 209, third storage device 211, and fourth storage device 213 generally represent any type or form of volatile or non-volatile storage device or medium capable of storing data and/or computer-readable instructions. Examples of first storage device 207, second storage device 209, third storage device 211, and fourth storage device 213 include, without limitation, Random Access Memory (RAM), Read Only Memory (ROM), flash memory, disk drives, Hard Disk Drives (HDDs), Solid-State Drives (SSDs), optical disk drives, caches, variations or combinations of one or more of the same, or any other suitable storage memory. In examples, the number of servers may be any practicable number. In embodiments, distributed storage devices, failure domains, and/or nodes may be coupled to and/or a constituent part of any practicable number of servers. Further, distributed storage devices, failure domains, and/or nodes may be coupled directly to network 204 and/or computing device 202. In an example, distributed storage devices, failure domains, and/or nodes may be a constituent part of computing device 202. In embodiments, entire storage capacities of first storage device 207, second storage device 209, third storage device 211, and/or fourth storage device 213 need not be used and/or be made available for storing information. In examples, partial storage capacities of first storage device 207, second storage device 209, third storage device 211, and/or fourth storage device 213 may be used and/or may be made available for storing information.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for distributing information across distributed storage devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may divide each of "K" distributed storage devices (DSDs) in a plurality of DSDs into "P" portions. In examples, "P" may be a sum of "M" data portions and "N" parity portions. The systems described herein may perform step 302 in a variety of ways. In one example, dividing module 104 may, as part of computing device 202 in FIG. 2, divide each of "K" distributed storage devices (e.g., first storage device 207, second storage device 209, and third storage device 211, where K=3) into "P" portions 121 (e.g., P=3), where "P" is a sum of "M" data portions 122 (e.g., M=2) plus "N" parity portions 123 (e.g., N=1).

In examples, each of the "P" portions may have substantially the same size. In a non-limiting example, each of the portions may be a storage block having a size of 40 gigabytes.

In some embodiments, each of the "P" portions store information as a part of a striped storage scheme. In embodiments, the provided techniques may be implemented as a part of a RAID data storage system.

As illustrated in FIG. 3, at step 304 one or more of the systems described herein may create "K" erasure coded volumes. In examples, each volume may include one portion on different DSDs, "M" data portions, and "N" parity portions. The systems described herein may perform step 304 in a variety of ways. In one example, creating module 106 may, as part of computing device 202 in FIG. 2, create "K" erasure coded volumes 124 (e.g., K=3 erasure coded volumes).

As illustrated in FIG. 3, at step 306 one or more of the systems described herein may combine the "K" volumes to create a file system. The systems described herein may perform step 306 in a variety of ways. In one example, combining module 108 may, as part of computing device 202 in FIG. 2, combine the "K" erasure coded volumes 124 to create a file system.

In some embodiments, method 300 may include storing data (e.g., information) in the "M" data portions on the DSDs. In additional examples, method 300 may include storing parity information in the "N" parity portions on the DSDs.

In examples, method 300 may include implementing at least one of the volumes as a layered volume.

As illustrated in FIG. 3, at step 308 one or more of the systems described herein may add a new DSD to the plurality of DSDs and divide the new DSD into "P" portions. The systems described herein may perform step 308 in a variety of ways. In one example, dividing module 104 may, as part of computing device 202 in FIG. 2, add a new DSD (e.g., fourth storage device 213), to the plurality of DSDs. This is an example of n+m+1. Dividing module 104 may, as part of computing device 202 in FIG. 2, divide the new DSD into "P" portions 121 (e.g., P=3). In examples, each DSD in the plurality of DSDs stores data portions and parity portions for different volumes.

As illustrated in FIG. 3, at step 310 one or more of the systems described herein may move data information and parity information to portions of the new DSD from portions of other DSDs in the plurality of DSDs. Portions that are moved from the portions of the other DSDs in the plurality of DSDs may come from different volumes, to maintain fault tolerance. One or more of the systems described herein may create a new volume from the portions of the other DSDs in the plurality of DSDs from which the data information and parity information was moved. In examples, the new volume may be added to the file system. The systems described herein may perform step 310 in a variety of ways. In one example, dividing module 104 may, as part of computing device 202 in FIG. 2, move data information and parity information to portions of the new DSD (e.g., fourth storage device 213) from portions of other DSDs (e.g., first storage device 207, second storage device 209, and third storage device 211) in the plurality of DSDs. Creating module 106 may create a new volume from the portions of the other DSDs (e.g., first storage device 207, second storage device 209, and third storage device 211) in the plurality of DSDs from which the data information and parity information was moved. In examples, combining module 108 may add the new volume to the file system.

As detailed above, the steps outlined in method 300 in FIG. 3 may provide methods for distributing information across distributed storage devices. In examples, the provided systems and methods may be used not only with storage devices, but also with failure domains and/or nodes. By doing so, in examples, the systems and methods described herein may improve the functioning of computing devices by automatically enabling increasing storage system capacity of fault-tolerant storage systems by one storage device at a time, thus enabling cost-effective storage management. Further, the systems and methods described herein may improve the functioning of computing devices by automatically enabling systems to provide up to substantially all available storage capacity without requiring changing erasure coding parameters and/or growing storage capacity by adding a minimum number of nodes. Also, in examples, the systems and methods described herein may also save power and/or better-manage network bandwidth utilization.

FIG. 4 is a block diagram of an example of an additional example system 400 for distributing information across distributed storage devices. To assist in describing advantages of the provided techniques, it is helpful to describe limits of conventional techniques. For example, in a conventional system having a 2:1 storage scheme and four nodes that each have 120 GB of storage capacity, only three nodes may be implemented to retain the 2:1 ratio, so the usable storage capacity for storing information (i.e., data) is only ($2/3$*120 GB*3)=240 GB. In contrast, for a system having a 2:1 storage scheme and four nodes that each have 120 GB of storage capacity, the provided techniques enable a maximum usable storage capacity for storing information of ($2/3$*120 GB*4)=320 GB, which is an increase in usable storage capacity of 50%. FIG. 4 depicts how the provided techniques enable providing the maximum storage capacity.

As illustrated in FIG. 4, example system 400 may include, at a first time 401, include distributed storage devices (DSD), such as a first DSD 402, a second DSD 404, a third DSD 406, and a fourth DSD 408. Thus, when four DSD are present, "K"=4. In non-limiting examples, first DSD 402, second DSD 404, third DSD 406, and fourth DSD 408 each have storage capacities of 120 GB and a ratio of 2:1 (M=2 and N=1) is implemented.

Each of the DSDs is divided into "P" portions, where "M"+"N"="P". As depicted in FIG. 4, each of first DSD 402, a second DSD 404, a third DSD 406, and a fourth DSD 408 are divided into three portions (P=3), each with a storage capacity of 120 GB/3=40 GB. Then, "K" volumes are created.

As depicted in FIG. 4, Volume 1 (V1) is created using a portion of first DSD 401, second DSD 404, and third DSD 406. Thus, V1 consumes 120 GB and provides usable storage of $2/3$*120 GB=80 GB.

Similarly, Volume 2 (V2) is created using a portion of first DSD 401, second DSD 404, and fourth DSD 408. Thus, V2 consumes 120 GB and provides usable storage of $2/3$*120=80 GB.

Similarly, Volume 3 (V3) is created using a portion of first DSD 401, third DSD 406, and fourth DSD 408. Thus, V3 consumes 120 GB and provides usable storage of $2/3$*120=80 GB.

Similarly, Volume 4 (V4) is created using a portion of second DSD 404, third DSD 406, and fourth DSD 408. Thus, V4 consumes 120 GB and provides usable storage of $2/3$*120=80 GB.

Thus, the provided techniques enable a maximum usable storage capacity for storing information of (4*80 GB)=320 GB, which is the maximum possible usable storage when first DSD 402, second DSD 404, third DSD 406, and fourth DSD 408 each have storage capacities of 120 GB and a ratio of 2:1 (M=2 and N=1) is implemented.

In examples, a volume set may be created by combining the four volumes (V1, V2, V3, and V4). A file system, such as a multi-volume file system, may be created by combining the four volumes (V1, V2, V3, and V4) and/or created from the volume set. The file system may be used by one or more applications. Thus, the provided techniques enable a maximum usable storage capacity for storing information of ($2/3$*120 GB*4)=320 GB.

FIG. 4 also depicts optional adding of a fifth DSD 410, having a storage capacity of 120 GB, at a second time 403.

Fifth DSD 410 may be added, for example, to increase storage capacity of system 400 and/or to increase storage bandwidth. Fifth DSD 410 may be divided into "P" portions, where "M"+"N"="P". Thus, fifth DSD 410 is divided into three portions (P=3), each with a storage capacity of 120 GB/3=40 GB.

Data information and parity information may be moved to portions of fifth DSD 410 from portions of first DSD 402, second DSD 404, third DSD 406, and fourth DSD. For example, part of V1 is moved from first DSD 402 to fifth DSD 410, part of V2 is moved from second DSD 404 to fifth DSD 410, and part of V3 is moved from third DSD 406 to fifth DSD 410. Each of V1, V2, and V3 is still distributed across three DSDs, so resiliency is not compromised.

In embodiments, a new volume may be created from the portions of the other DSDs in the plurality of DSDs from which the data information and parity information was moved. For example, Volume 5 (V5) may be created from portions of first DSD 402, second DSD 404, and third DSD 406 from which the data information and parity information was moved. Volume 5 is distributed across three DSDs, so resiliency is not compromised. Thus, V5 consumes 120 GB and provides usable storage of ⅔*120=80 GB.

In examples, Volume 5 may be added to the volume set previously created by combining V1, V2, V3, and V4. The existing file system may be grown by the additional 80 GB provided by adding V5, to a maximum usable storage capacity of 400 GB. Thus, the provided techniques enable increasing usable storage capacity by adding a single DSD.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for distributing information across distributed storage devices, at least a portion of the method being performed by a computing device comprising at least one processor, the method comprising:

dividing, at the computing device, each of a quantity of "K" distributed storage devices (DSDs) in a plurality of DSDs into a quantity of "P" portions, wherein:

"P" is less than "K"; and

"P" is a sum of a quantity of "M" data portions and a quantity of "N" parity portions;

creating a quantity of "K" erasure-coded volumes on the "K" DSDs, wherein:
- each erasure-coded volume includes "M" data portions and "N" parity portions; and
- each portion in each erasure-coded volume is stored in a different DSD; and combining the "K" volumes to create a file system.

2. The computer-implemented method of claim 1, further comprising:
- adding a new DSD to the plurality of DSDs; and
- dividing the new DSD into "P" portions.

3. The computer-implemented method of claim 2, further comprising:
- moving data information and parity information to portions of the new DSD from portions of other DSDs in the plurality of DSDs; and
- creating a new volume from the portions of the other DSDs in the plurality of DSDs from which the data information and parity information was moved.

4. The computer-implemented method of claim 3, further comprising:
- adding the new volume to the file system.

5. The computer-implemented method of claim 1, wherein each of the "P" portions has substantially the same size.

6. The computer-implemented method of claim 1, wherein each of the "P" portions store information as a part of a striped storage scheme.

7. The computer-implemented method of claim 1, wherein each DSD in the plurality of DSDs stores data portions and parity portions for different volumes.

8. A system for distributing information across distributed storage devices, the system comprising:
- a dividing module, stored in a memory, that divides each of a quantity of "K" distributed storage devices (DSDs) in a plurality of DSDs into a quantity of "P" portions, wherein:
  - "P" is less than "K"; and
  - "P" is a sum of a quantity of "M" data portions and a quantity of "N" parity portions;
- a creating module, stored in a memory, that creates a quantity of "K" erasure-coded volumes on the "K" DSDs, wherein:
  - each erasure-coded volume includes "M" data portions and "N" parity portions; and
  - each portion in each erasure-coded volume is stored in a different DSD;
- a combining module, stored in a memory, that combines the "K" volumes to create a file system; and
- at least one physical processor that executes the dividing module, the creating module, and the combining module.

9. The system of claim 8, further comprising:
- adding a new DSD to the plurality of DSDs; and
- dividing the new DSD into "P" portions.

10. The system of claim 9, further comprising:
- moving data information and parity information to portions of the new DSD from portions of other DSDs in the plurality of DSDs; and
- creating a new volume from the portions of the other DSDs in the plurality of DSDs from which the data information and parity information was moved.

11. The system of claim 10, further comprising:
- adding the new volume to the file system.

12. The system of claim 8, wherein each of the "P" portions has substantially the same size.

13. The system of claim 8, wherein each of the "P" portions store information as a part of a striped storage scheme.

14. The system of claim 8, wherein each DSD in the plurality of DSDs stores data portions and parity portions for different volumes.

15. A non-transitory computer-readable medium comprising one or more computer-executable instructions that, when executed by at least one processor of a computing device, cause the computing device to:
- divide, at the computing device, each of a quantity of "K" distributed storage devices (DSDs) in a plurality of DSDs into a quantity of "P" portions, wherein:
  - "P" is less than "K"; and
  - "P" is a sum of a quantity of "M" data portions and a quantity of "N" parity portions;
- create a quantity of "K" erasure-coded volumes on the "K" DSDs, wherein:
  - each erasure-coded volume includes "M" data portions and "N" parity portions; and
  - each portion in each erasure-coded volume is stored in a different DSD; and
- combine the "K" volumes to create a file system.

16. The non-transitory computer-readable medium of claim 15, wherein the computer-executable instructions comprise computer-executable instructions that, when executed by the at least one processor of the computing device, cause the computing device to:
- add a new DSD to the plurality of DSDs; and
- divide the new DSD into "P" portions.

17. The non-transitory computer-readable medium of claim 16, wherein the computer-executable instructions comprise computer-executable instructions that, when executed by the at least one processor of the computing device, cause the computing device to:
- move data information and parity information to portions of the new DSD from portions of other DSDs in the plurality of DSDs; and
- create a new volume from the portions of the other DSDs in the plurality of DSDs from which the data information and parity information was moved.

18. The non-transitory computer-readable medium of claim 17, wherein the computer-executable instructions comprise computer-executable instructions that, when executed by the at least one processor of the computing device, cause the computing device to:
- add the new volume to the file system.

19. The non-transitory computer-readable medium of claim 15, wherein each of the "P" portions has substantially the same size.

20. The non-transitory computer-readable medium of claim 15, wherein each of the "P" portions store information as a part of a striped storage scheme.

* * * * *